US009573769B2

(12) United States Patent
Specht (10) Patent No.: US 9,573,769 B2
(45) Date of Patent: Feb. 21, 2017

(54) SYSTEM LINE

(71) Applicant: AVANCON SA, Riazzino (CH)

(72) Inventor: Dieter Specht, Arcegno (CH)

(73) Assignee: AVANCON SA, Riazzino (CH)

( * ) Notice: Subject to any disclaimer, the term of this patent is extended or adjusted under 35 U.S.C. 154(b) by 0 days.

(21) Appl. No.: 14/861,170

(22) Filed: Sep. 22, 2015

(65) Prior Publication Data

US 2016/0083194 A1  Mar. 24, 2016

(30) Foreign Application Priority Data

Sep. 22, 2014 (IT) .............................. RM2014A0537

(51) Int. Cl.
*B65G 43/10* (2006.01)
*B65G 13/11* (2006.01)

(52) U.S. Cl.
CPC .............. *B65G 43/10* (2013.01); *B65G 13/11* (2013.01); *B65G 2203/0266* (2013.01)

(58) Field of Classification Search
CPC .. B65G 43/10; B65G 13/11; B65G 2203/0266
USPC ......................................................... 198/575
See application file for complete search history.

(56) References Cited

U.S. PATENT DOCUMENTS

| 8,307,976 | B2 * | 11/2012 | Kratz | ..................... | B65G 23/08 |
| | | | | | 198/788 |
| 8,622,765 | B2 * | 1/2014 | Sulzer | ................. | H01R 4/2454 |
| | | | | | 439/402 |
| 2012/0104294 | A1 * | 5/2012 | Heusser | .............. | F15B 13/0857 |
| | | | | | 251/129.01 |
| 2015/0183583 | A1 * | 7/2015 | Specht | ................... | B65G 39/12 |
| | | | | | 198/790 |

FOREIGN PATENT DOCUMENTS

| DE | 20 2006 021083 U1 | 6/2012 |
| EP | 2 456 010 A1 | 5/2012 |
| WO | 2004/067416 A1 | 8/2004 |
| WO | 2013/182888 A | 12/2013 |

OTHER PUBLICATIONS

IT Search Report, dated May 22, 2015, from corresponding IT application.

* cited by examiner

*Primary Examiner* — William R Harp
(74) *Attorney, Agent, or Firm* — Young & Thompson (57) ABSTRACT

A conveying system line includes a supporting frame extending substantially parallel with a system feeding direction; a plurality of driving elements supported by the supporting frame; a motor for driving at least one portion of the plurality of driving elements; a drive assembly to transfer the motion from the motor to the at least one portion of the plurality of driving elements; a control and power ASi system; a main ASi-controller; and a secondary ASi-controller, the main ASi-controller communicating with secondary main ASi-controllers through an AS-interface cable, the main ASi-controller including a main ASi-box, and the secondary ASi-controller including a secondary ASi-box, the main and secondary ASi-boxes having at least one first corresponding transversal coupling dimension, the supporting frame including a housing compartment adapted to house the main and secondary ASi-boxes.

20 Claims, 9 Drawing Sheets

SYSTEM LINE

FIELD OF THE INVENTION

The present invention concerns the field of system line such as assembly lines, production lines and conveying lines, and in particular a system line comprising an ASi-BUS system (=Actuator, Sensor interface bus system) and elements as activators, sensors and masters that are used for the control, on the lower level installation, and for the communications and the interface between the different elements that manage the system line.

The system line have a wide area of applicability such as post offices, airports and different kind of manufacturing or logistic industries involving the product handling among several operative stations in the production process or in the handling system thereof.

KNOWN ART

The Applicant has observed that the implementation of systems intended for controlling and electrically powering the driving means of system line each time requires a lot of wasted time in terms of working hours per person and costs because the cables and the control boxes, composing the devices to control and electrically powering the actuators or diving means and the sensors, must be fixed and screwed to the frames of the systems line and/or must be fixed in separated channels below and then had to be fixed onto the cables with separate screws.

The Applicant has further observed that realizing such a controlling and powering system every time dedicated to a specific system line, such as an assembly line or a conveyor system, could require a much bigger store, in terms of particular control unit, fastening member types and different wirings, for the company manufacturing the system line.

In order to solve the above mentioned problems has been proposed to use the Asi Bus system.

As is well known, these ASi-Bus systems are used for controlling apparatuses, assembly lines, production lines and conveying lines for transportation of boxes and supports and cartons or machine-elements or solar panels or furniture plates, which have to be directed and steered throw-out the production, assembly and logistic centers.

Although the ASi-Bus system is already very easy to put in place, the special cables and the fixing element of the typical ASi-Bus System i.e connector knifes or pins or needles need to be coupled in an exact position with the Asi Cables and according a predetermined orientation.

The Applicant has observed that, for example in case of a machine line, (for example solar panels production line and concatenation) apparatus, assembly line or conveying system in which the system controlling and powering the drive means and the sensor means is composed of several units which are electrically connected one to another through ASi-cables, the controlling elements connected to the ASi-cables must contact such cables with extreme precision so that the piercing needles or knifes of these elements, realizing the electrical connection, penetrate the cable in a determined precise position and with the proper inclination.

The patent application WO2013/182888 partially solves the problems described above, however, the positioning of the control elements, master and slave boxes, are not positioned in contact with the cables ASi-cables vertically so that the piercing needles o knifes are not met in a precise way and above all with the correct inclination.

In this case in fact the control elements are positioned into the frame along a first edge thereof and a subsequent angular movement brings these elements parallel to the ASi-cables.

The Applicant has observed that such kind of coupling can lead to damage of the piercing needles or knives, and then an electrical connection failure.

The Applicant has also observed that in order to place the ASi Bus System onto the system line frames, whose parts must be connected and/or electrically powered, is necessary a separate base, that includes the As-interface cables and the knifes or pins connectors, and a cover where each part (base and cover) has to be fixed with separate screws on the frame of the system line us.

The base and the cover are generally made of thermoplastic materials.

Then the Applicant noticed the need to provide a new, easy to build, ASi-bus system wherein the control-elements for the drive and the sensors and the master means are standard, in the meanwhile an ASi-bus system easy and simple to be installed and not needing a number of different parts and wirings to be kept in the store and to be handled and assembled.

The Applicant then found the need of providing a new fixation system for an ASi system that is simply to be assembled, wherein the needles or knifes of the ASi-bus control elements pierce the Asi cables, which realize the electrical connection, in a precise and predetermined position and with the proper inclination and without screws to be fixed.

SUMMARY OF THE INVENTION

Therefore, in its first aspect the invention concerns a system line of the type: assembly line, production line, machine centers, concatenation or conveying system comprising:
at least one supporting frame extending substantially in parallel with the feeding direction (F) of the system;
at least one plurality of driving means supported by said supporting frames;
at least one motor or at least a pneumatic device for driving at least one portion of said plurality of driving elements;
at least one drive assembly to transfer the motion from said motor to said at least one portion of the plurality of driving elements;
at least one control and power ASi system;
characterized by comprising:
at least one main ASi-controller;
at least one secondary ASi-controller; said main ASi-controller communicating with said at least one secondary ASi-controller or with other ASi-main controllers through at least one ASi-interface cable;
said main Asi-controller comprising a main Asi-box; and
said secondary Asi-controller comprising a secondary Asi-box;
said main and secondary ASi-boxes having at least one first corresponding transversal coupling dimension (M);
said supporting frame comprising a housing compartment extending in the feeding direction of the system line, adapted to house said main and secondary ASi-boxes;
said supporting frame comprising fastening means to removably block said at least one main box and said at least one secondary box (14) inside the housing compartment;

said housing compartment comprising at least one housing seat for said at least one ASi-interface cable;
said housing seat is shaped so as to arrange the ASi-interface cable in such a position, with respect to said main and secondary boxes, that it is penetrated by piercing needles or knifes protruding from said main and secondary ASi-boxes in order to implement the electrical connection among said main and secondary ASi-controllers and said at least one ASi-interface cable;
said fastening means comprising:
at least one contrast element positioned at least partially at a distance with respect to said main Asi-box and/or the secondary Asi-box greater than or equal to that of the perforating needles projecting from said main box and secondary;
at least one pressure element adapted to be removably positioned between said main Asi-box and/or the secondary ASi-box and said contrast element.

Furthermore, in the present invention scope the terms "transversal", "transversally", denote a direction substantially perpendicular to the feeding direction (F) of goods in the system line.

On the contrary, the term "longitudinal" denotes a direction substantially parallel or coincident with the feeding direction (F) of goods in the system line.

The present invention, in the aforesaid aspect, may present at least one of the preferred characteristics hereinafter described.

Advantageously, said contrast element comprises at least one first rib transversally extending towards the inside of the supporting frame and the pressure element comprises at least one spacer shaped to be removably positioned among the first rib and the main and/or secondary ASi-boxes so that the main and/or secondary ASi-boxes are kept in position with respect to at least one AS-interface cable.

Conveniently, the fastening means comprise at least one second rib transversally extending towards the inside of the supporting frame, on a wall opposed to that of the first rib.

Preferably, the second rib is shaped and dimensioned to couple with an inclined surface provided next to at least one transversal end of at least one main and/or secondary ASi-boxes.

Advantageously, the second rib is shaped and dimensioned to abut, at least partially, against a second inclined surface provided next to at least one transversal end of at least one pressure element.

Conveniently, the second rib is elastically flexible.

Preferably, the housing compartment has a second transversal coupling dimension (N) greater than, or equal to, the first transversal coupling dimension (M) said main and secondary boxes have in common, and the pressure element has such a transversal dimension, greater that N/2, to abut at least partially against said second rib.

Preferably, the fastening means comprise an upper lid of the housing compartment.

Advantageously, the upper lid comprises at least one pressure element extending from the upper lid to the main and/or secondary boxes to abut against the main and/or secondary boxes when the upper lid is closed.

Conveniently, the housing compartment comprises at least two vertical ribs which are transversely spaced in order to house said at least one AS-interface cable as interposed there between.

Preferably, at least one of the vertical ribs has a curved portion to vertically block at least one portion of said AS-interface cable.

Conveniently, at least one housing seat for the at least one AS-interface cable is made, at least partially, in the main and secondary boxes.

Advantageously, the housing seat comprises at least two side supporting ribs, each protruding from an inner wall of the supporting frame to laterally support the main and secondary boxes.

Preferably, the housing seat comprises at least one vertical supporting element extending from a stiffening element transversal to the inner walls of the support frame; the vertical supporting element being shaped to engage into a coupling seat provided on a lower surface of the main and secondary boxes.

Advantageously, the system line comprises a plurality of working zones, each working zones being defined by at least one motor and/or at least one presence sensor, each motor being combined with a secondary ASi-controller, each presence sensor being combined with a secondary ASi-controller. These secondary ASi-controllers can being installed in the above-described manner easily under each motor or sensor, regardless in which position or distance these elements are. This allows to use always the same cable length of the secondary elements, as in this case the sensor and the motor.

Preferably, the main controller is in communication with a plurality of secondary ASi-controllers and other main ASi-master controllers within the system.

Advantageously, the drive members comprise driving rollers and/or wheels and/or portions of dragging belts.

BRIEF DESCRIPTION OF THE DRAWINGS

Further characteristics and advantages of the invention will be more evident from the detailed description of some preferred embodiments, but not exclusive, of a new system line according to the present invention.

Such a description will be hereinafter explained referring to the attached drawings, provided for purposes of illustrations only, and thereby not limitative, wherein.

DETAILED DESCRIPTION OF EMBODIMENTS OF THE INVENTION

Referring to FIGS. 1-8, a system line such as assembly line or production line or conveying system, according to the present invention, is identified with the reference numeral 100.

In the following description, we will refer to a conveying system 100, but it is to be understood that what is said can be extended to other system line without exit from the scope of the present invention.

The conveying system 100 has at least two supporting frames 2, 3 on the outside in the axial direction which extend substantially parallel in the feeding direction of the conveyor 100. The feeding direction indicated by the arrow F in figures, indicates the extent direction of the conveyor 100.

Preferably, the supporting frames 2, 3 have a tubular shape, as shown in the embodiments of FIGS. 1-4.

Alternatively, the supporting frames might have a "C" or "L" section or again another section shape without departing from the protection scope of the present invention.

Advantageously, the supporting frames 2, 3 are made of extruded materials.

Preferably, the supporting frames 2, 3 are made of extruded aluminium.

Alternatively, the supporting frames 2, 3 are made of extruded reinforced plastic materials.

A plurality of driving wheels 5 or rollers 4 is located between the two supporting frames 2, 3.

The driving wheels 5 or the driving rollers are rotatably mounted each on a supporting shaft and they are operated by the driving assembly and a plurality of motors 9 described in more detail afterwards.

In the embodiment shown in the figures, the conveying system or conveyor 100 comprises a plurality of driving wheels 5 for each supporting frame 2 or 3.

In other words, for each supporting frame 2 or 3 there is a plurality of driving wheels 5 placed side by side which extend substantially along the whole length of the conveying system 100.

Each supporting shaft is adapted to be engaged in at least one of said supporting frames 2 or 3 to support at least one roller and/or at least one wheel 5.

In detail, each supporting shaft is rotatably constrained to the supporting frame 2 or 3 by means of at least one bearing.

The bearing is not directly constrained to the supporting tubular frame 2 or 3, but it is supported by the latter through a suitable housing 8 in its turn constrained to the inner walls of the tubular supporting frame. The conveyors system 100 according to the present invention are divided in working zones, each working zone comprising at least one wheel 5 and, in case, a positioning sensor 10 that controls the presence of material to be conveyed on the wheel 5.

A secondary Asi-controller 11 is provided in order to control each motor 9 and each sensor 10.

Each secondary controller 11 comprises the electronic circuits, enclosed in a secondary box 14, adapted to control the motor 9 or the positioning sensor 10.

In other words, each sensor 10, as well as each motor 9, is combined with a secondary controller 11.

The secondary ASi-controllers 11 are connected one to another and they are, in their turn, each connected to a main ASi-controller 12 allowing the information exchange and the coordination of the secondary controllers 11.

Preferably, the secondary controllers 11 are connected one to another and they are, in their turn, each connected to a main ASi-controller 12 through at least one AS-interface cable.

A main ASi-controller 12 can control up to sixty/sixty two secondary controllers 11, in the specific case the main ASi-controller 12 can control up to sixty/sixty two secondary ASi-controllers 11.

Therefore a conveying system 100 according to the present invention comprises working macro-areas each defined by a main ASi-controller 12 and several secondary ASi-controllers 11, each one of the latter being combined with a motor 9 or a positioning sensor 10.

Each main ASi-controller 12 comprises the electronic circuits and the electronics necessary for controlling the secondary ASi-controllers 11. Therefore, these electronic circuits and electronics are contained in a main ASi-box 13.

Each macro-area can comprises several secondary ASi-boxes 14 and one main ASi-box 13.

The secondary ASi-boxes 14 are then electrically connected one to another through at least one AS-interface cable and also the secondary ASi-boxes 14 are electrically connected to the main ASi-box 13 through the same AS-interface cable or another one.

Every macro-area comprises several zones or operations. (As diverters, switches, pushers, transfers, crossings . . . )

For each macro-area there are several secondary boxes 14, each controlling the position sensor 10 of every zone and several secondary boxes 14, each one controlling the motor 9 of every zone or a pneumatic valve or a pneumatic cylinder or similar.

All the secondary ASi-boxes 14 report to the main ASi-controller 12.

This main ASi-controller 12 can report or can be controlled by a computing system of higher level. The main ASi-controller 12, enclosed in its main box 13, drives the motors 9—whether interrupting or driving the motion—so that every zone or operation is controlled individually; no carried goods or products will touch another one and they will not be driven forward until the subsequent zone is empty.

Zone after zone the goods are carried until the subsequent zone is occupied. In this case, the motor 9 can not move until the subsequent zone is occupied, then it will restart.

The main ASi-box 13 and the secondary ASi-boxes 14 have the same cross section and, except the length along the feeding direction, substantially the same shape.

Figure 1:
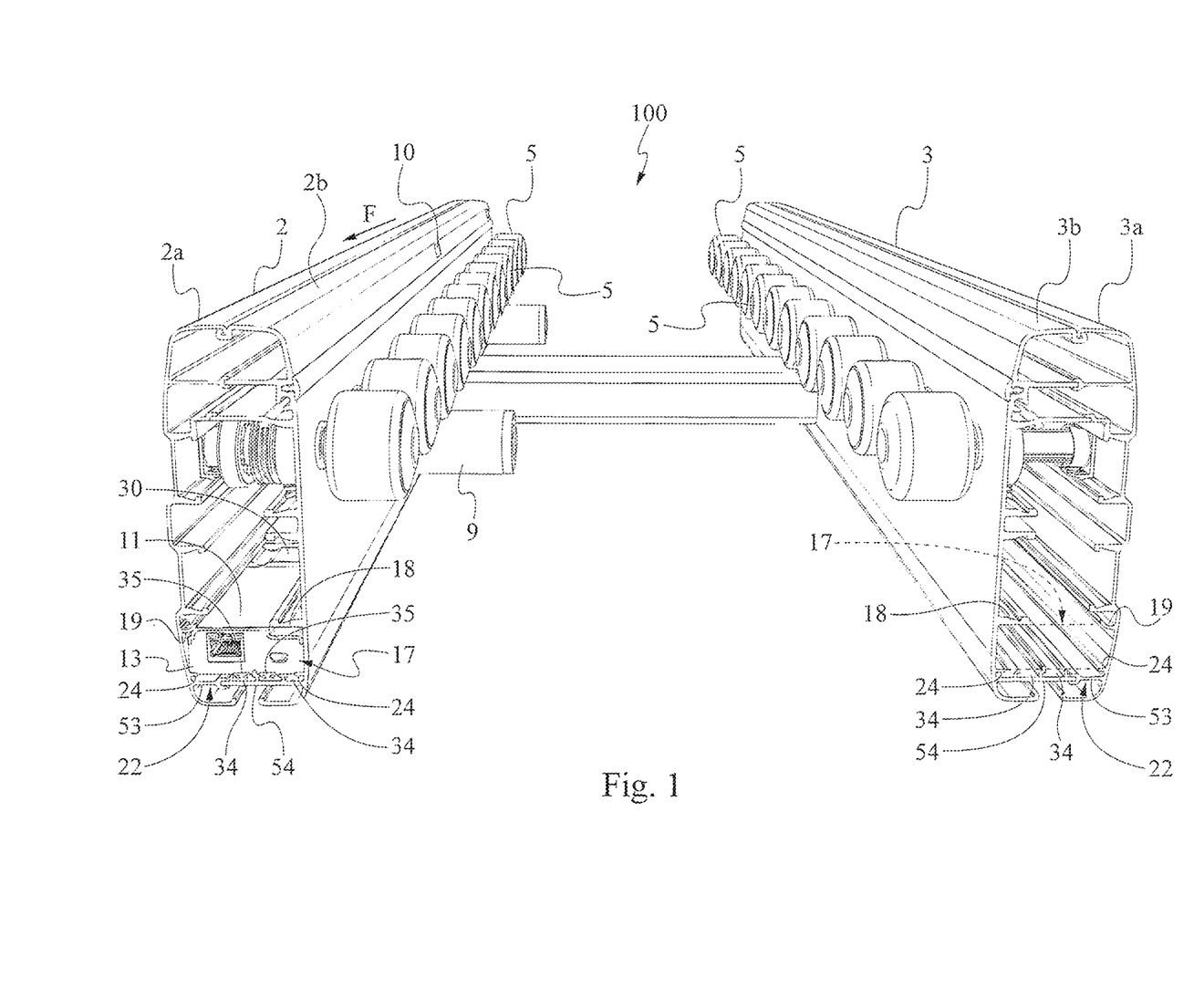
FIG. 1 is a schematic perspective front view of a first embodiment of a system line according to the present invention.
Figure 2:
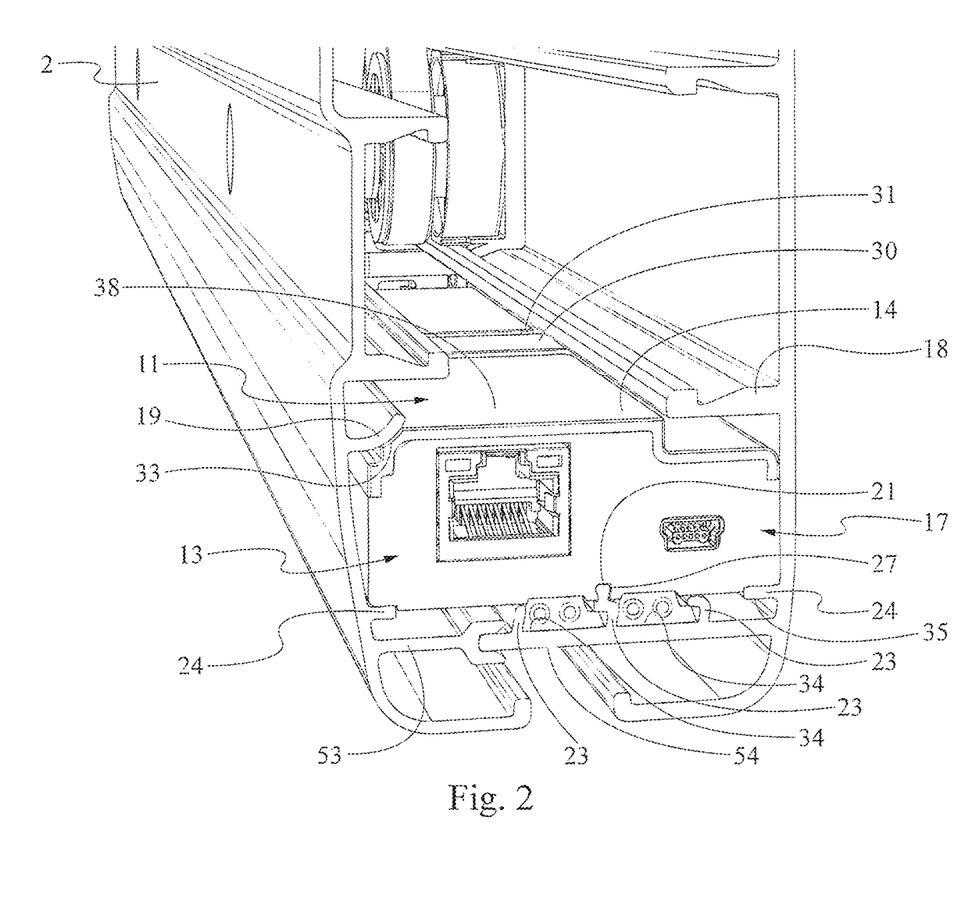
FIG. 2 is a schematic and enlarged perspective front view of a portion of the system line of FIG. 1.
Figure 3:
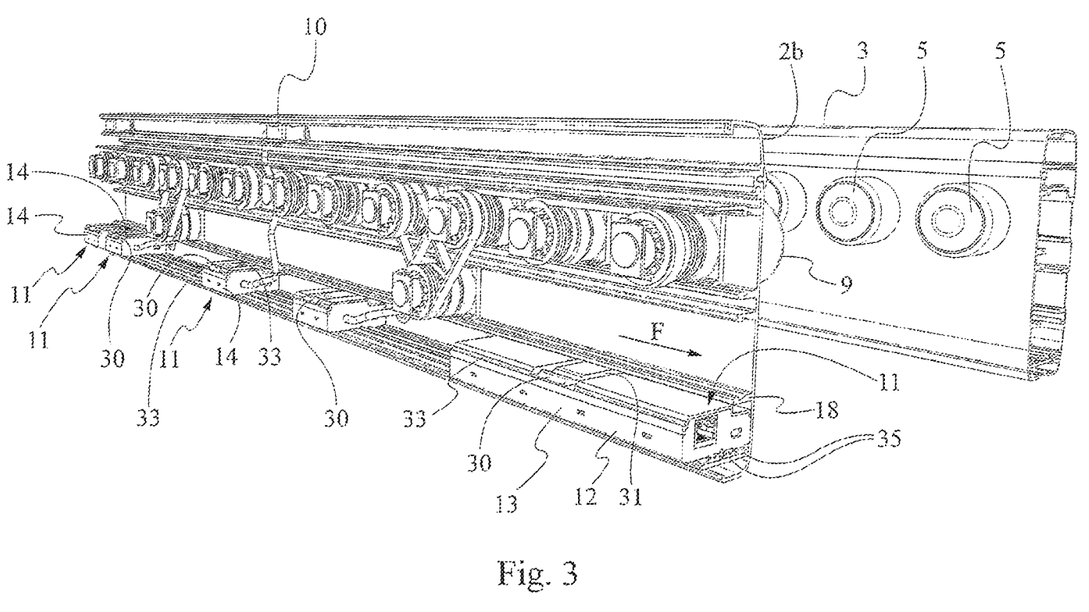
FIG. 3 is a schematic perspective partially exploded view of the system line shown in FIG. 1 with the pressure elements coupled with the main and secondary Asi-boxes.

In other words, as can be seen in FIG. 3, the main ASi-boxes 13 and the secondary ASi-boxes 14 substantially have the same transversal shape, but the main boxes 13 are elongated along the feeding direction, identified by the arrow F in FIG. 3.

Each main ASi-box 13 and each secondary ASi-box 14 have a substantially parallelepiped shape.

For the standardization of element and easiness of coupling parts, the ASi-main 13 and secondary ASi-boxes 14 have at least one first corresponding transversal dimension of coupling M.

The main 13 and secondary 14 ASi-boxes are housed in an apposite compartment 17 extending longitudinally along the feeding direction of the conveying system.

The supporting frame 2, 3 comprise fastening means to removably block the main ASi-box 13 and the secondary ASi-boxes 14 inside the housing compartment 17.

Therefore, the housing seat 17 extends in the feeding direction F of the conveying system 100 and has a dimension, named second coupling dimension N, greater or substantially corresponding to the first transversal coupling dimension M of the main 13 and secondary 14 ASi-boxes.

In the embodiment shown in figure, the coupling dimension N is a dimension transversal to the feeding direction F.

In other words, the housing seat 17 has a transversal dimension N substantially coincident to the transversal coupling direction M of the main 13 and secondary 14 ASi-boxes.

Advantageously, the housing compartment 17 comprises at least one housing seat 34 for at least one AS-interface cable 35.

In the embodiments shown in figures, the housing compartment 17 has two parallel housing seats 34 placed side by side for two AS-interface cables which extend longitudinally for the whole length of the supporting frame 2, 3 accommodating it.

Each housing seat 34 is shaped so as to arrange the AS-interface cable 35 in such a position, with respect to the main 13 and secondary 14 ASi-boxes, that it is penetrated by piercing needles 7 protruding from the main 13 and secondary 14 boxes in order to implement the electrical connection among the main 13 and secondary 14 ASi-boxes and the AS-interface cable.

In other terms the piercing needles 7, exiting from each main 13 and secondary 14 ASi-boxes and allowing the electrical connection, are in a predetermined position, both in the longitudinal and transversal direction.

In such a position, they have to meet the AS-interface cable 35 so that they can penetrate it to allow the electrical connection.

For this purpose, it is important that the housing seat 34 can allow the AS-interface cable to be correctly positioned with respect to these needles 7.

Still for ensuring the electrical connection among the AS-interface cable 35 and the piercing needles 7 exiting from each main 13 and secondary 14 boxes, it is necessary that the same needles are pressed against the AS-interface cable 35 firmly.

For this purpose, at least one contrast element and at least one pressure element are provided.

The contrast element is positioned at least partially at a distance with respect to said main Asi-box 13 and/or the secondary Asi-box 14 greater than or equal to that of the piercing needles 7 projecting from the main ASi-box 13 and the secondary ASi-box 14.

The pressure element 30 is adapted to be removably positioned between said main Asi-box 13 and/or the secondary ASi-box 14 and the contrast element pressure element so as to keep in position the main 13 and/or secondary ASi-boxes 14 against the AS-interface cable 35.

In other words, the contrast element 30 is not directly positioned in contact with the main Asi-box 13 and/or the secondary ASi-box 14, but at a distance such as to allow the coupling between the main ASi-box 13 and/or the secondary ASi-box 14 and the AS-interface cable 35, substantially according to a vertical direction.

In this way, it is possible firstly to couple the main ASi-box 13 and/or the secondary ASi-box 14 with the AS-interface cable 35, substantially according a vertical direction, thus avoiding possible damage to the piercing needles 7 and then lock them in position by means of the pressure element 30 which rest on the upper surface of the main and secondary ASi-boxes.

In the embodiment shown in FIGS. 1-4, the supporting frame 2, 3 has a tubular shape and the housing compartment 17 is obtained in the lower portion of the supporting frame 2, 3.

In detail, in the embodiment shown in FIG. 1-4, it can be seen how each tubular supporting frame 2 or 3 is realized by two substantially specular and symmetric half-shells 2a, 2b, 3a, 3b joined together by locking means.

By way of example, screws and bolts can be provided as locking means adapted to engage in corresponding slots, generally positioned in the lower portion of the tubular frame itself, in both the half-shells 2a, 2b, 3a, 3b.

To render the two half-shells 2a, 2b, 3a, 3b more stable, once they are closed, the profile comprises a transversal stiffening element 22 that is composed, in the embodiment shown in figures, of a fork-shaped element 53 and a bracket-shaped element 54, adapted to be coupled with the prongs of the fork-shaped element 53.

In detail, the fork-shaped element 53 extends horizontally from an inner wall of a half-shell 2a, 2b, 3a, 3b and it couples with the bracket-shaped element 54 extending horizontally in a position corresponding to the inner wall of the remaining half-shell 2a, 2b, 3a, 3b.

The stiffening element 22 composed of the fork-shaped element 53 and the bracket-shaped element 54 constitute the lower portion of the housing compartment 17.

From the transversal stiffening element 22 a vertical supporting element 21 extends substantially vertically.

The vertical supporting element 21 is shaped to engage into a coupling seat 27 provided on a lower surface of the main 13 and secondary 14 boxes.

Preferably, the vertical supporting element 21 has an L-shaped upper end.

The vertical supporting element 21 allows, as the tubular frame 2, 3 is opened, i.e. during the installation, to support the main 13 and secondary 14 boxes.

In the embodiment shown in FIGS. 1-4, there are two housing seats 34 for two adjacent AS-interface cables 35.

Each housing seat 34 is partially composed of two vertical ribs 23 which are transversely spaced in order to house the AS-interface cable 35 as interposed there between.

The vertical ribs 23 extend along the feeding direction F substantially for the whole extent of the conveying system itself.

According to this embodiment there are three vertical ribs 23 which are transversely spaced and realize, together with the bracket-shaped element 54, at least in part, two adjacent and parallel housing seats 34 for two AS-interface cables 35.

Advantageously, two of the three vertical ribs 23 have a curved portion on top to vertically block at least one portion of the AS-interface cable 35.

Still according to this embodiment, one of the three vertical ribs 23 is coincident with the vertical supporting element 21.

Still according to this embodiment, the housing compartment 17 has at least one first side rib 18, realizing the contrast element for the pressure element 30 which keep in position the main and the secondary ASi-boxes against the AS-interface cables 35.

The first side rib 18 extending transversely towards the inside of the supporting frame 2, 3 and one pressure element 30 to keep in position the main 13 and/or secondary 14 boxes against the AS-interface cables 35.

In detail, the first rib 18 extends transversely towards the inside of the supporting frame 2, 3.

The first side rib 18 has a transversal extent smaller than the transversal coupling dimension M, preferably smaller than 15% of the transversal coupling dimension M, and it extends in the feeding direction F substantially for the whole extent of the conveying system itself.

Figure 4:
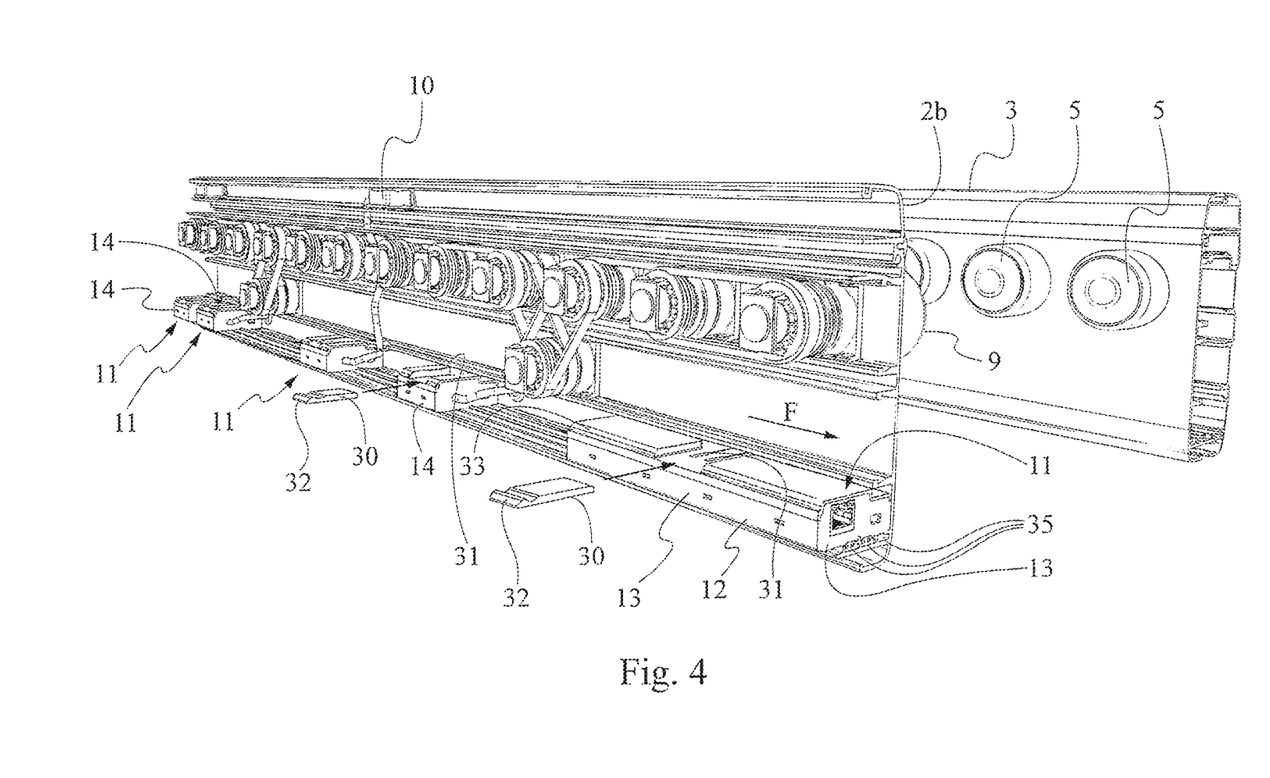
FIG. 4 is a schematic perspective partially exploded view of the system line shown in FIG. 1 with part of the pressure elements pulled out from the coupling with the main and secondary Asi-boxes.

The pressure element 30 is composed, as better shown in FIG. 4, of a spacer shaped to be inserted in a removable manner between the first side rib 18 and the main 13 and/or secondary 14 boxes so that the main 13 and/or secondary 14 boxes are kept vertically in position with respect to the AS-interface cables.

The pressure element 30 is like substantially a parallelepiped body having a such a thickness to abut, on top, against the first side rib 18 and, on the bottom, against an upper surface of the main 13 and/or secondary 14 boxes so that the same box is pressed firmly against the AS-interface cables 35.

The pressure element 30 has a thickness greater than or equal to half of the height of the piercing needles 7, preferably greater than or equal to the height of the piercing needles 7.

A groove 31 can be provided on the main 13 and secondary 14 boxes and have such a dimension to accommodate and block the pressure element 30 in the feeding direction F.

To allow an easy insertion between the first rib 18 and the main or secondary box, the pressure element 30 has a restricted transversal extent, shorter than that of the coupling dimension M, but preferably it is able to abut against a second side rib 19 arranged on the side wall of the tubular frame 2, 3 opposite to that containing the first side rib 18.

For this purpose, the pressure element 30 has an inclined wall 32 adapted to abut against the second side rib 19.

Always referring to this embodiment, it can be seen that the second rib 19 is shaped to abut also against a smoothed part 33 having the shape of an arc of circle, provided on the main boxes 13 and the secondary boxes 14 and against the pressure element 30, in particular against the inclined wall 32 of the pressure element 30.

The second rib 19, having the shape of an arc of circle too, has its concavity facing upwards. The second rib 19 makes part of the fastening means to latch the main 13 and secondary 14 boxes inside the housing seat 17. For this purpose, the second rib 19 can be elastically flexible.

The housing seat 17 further has side supporting ribs 24, at least three, each protruding from an inner wall of the tubular frame 2, 3 to laterally support the main 13 and secondary 14 ASi-boxes.

Each third side rib 24 has a limited transversal extent smaller than the transversal coupling dimension M, preferably smaller than 10% of the transversal coupling dimension M, and it extends in the feeding direction F substantially for the whole extension of the conveying system itself.

The third side ribs 24 are placed under the first 18 and second 19 side ribs, but over the ribs 23, at such a height that the main 13 and secondary 14 ASi-boxes, once they lean on the third side ribs 24, form the upper portion of the housing seats 34.

In other terms, the third side grooves 24 are placed at such a height that the main 13 and secondary 14 boxes, once leant on the third side ribs 24, lean on the upper surface of the AS-interface cables 35.

Figure 5A:
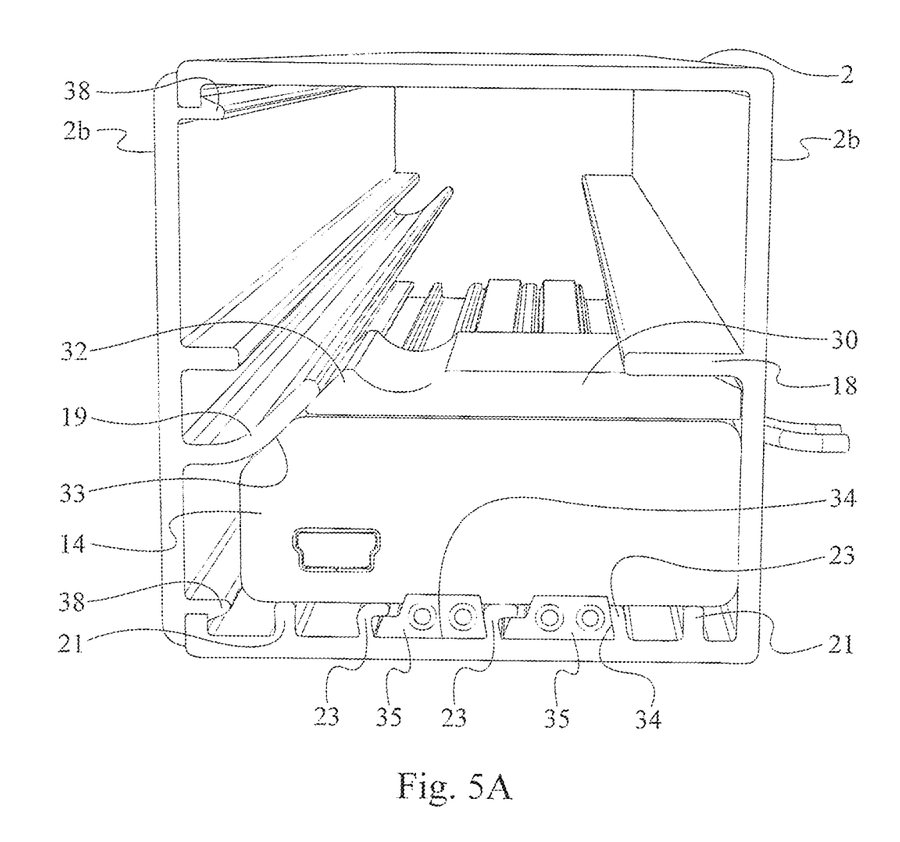
FIG. 5A is a schematic front view of an alternative implementation of supporting frame for the system line according to the present invention
Figure 5B:
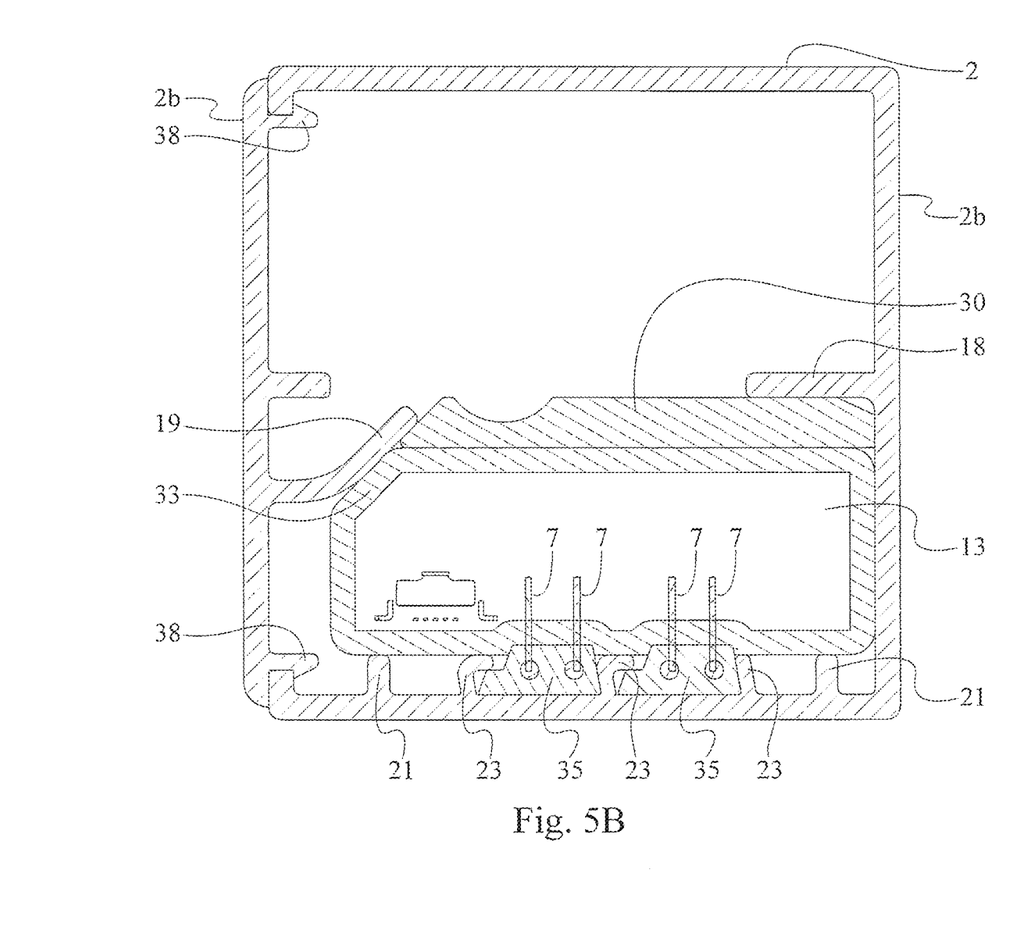
FIG. 5B is a schematic sectional view of an alternative implementation of supporting frame for the conveying system shown in FIG. 5A.

In FIGS. 5a, 5b an alternative embodiment of the supporting frame 2, 3 is shown. According to this embodiment, the supporting frame 2, 3 still has a tubular shape, but it is composed of a half-shell 2b, 3b having a C-shape and removably closed by a side lid 2a, 3a.

In FIG. 5a, 5b only one supporting frame 2, 3 is shown, in particular the supporting frame 2, but it is understood that what mentioned is also applied to the tubular frame 3.

The side lid 2a has convenient means for the blocking to the C-shaped half-shell 2b, such as little flexible hooks 38.

The housing compartment 17, also in this embodiment, is realized in the lower portion of the supporting frame 2.

The housing compartment 17 provides for two housing seats 34 for two AS-interface cables 35, which adjoin.

The two housing seats 34 for two AS-interface cables are realized in part among three vertical ribs 23 which are transversely spaced, two transversely-spaced vertical ribs 23 are arranged at such a distance to house the AS-interface cable 35 as interposed therebetween.

The vertical ribs 23 extend along the feeding direction F substantially for the whole extent of the conveying system itself.

According to this embodiment there are three vertical ribs 23 which are transversely spaced and realize, together with the base length of the C-shaped half-shell 2b, at least in part, two adjacent and parallel housing seats 34 for two AS-interface cables 35.

Also according to this embodiment a first 18 and a second 19 side ribs and a pressure element 30 are provided, which are completely similar to those previously described referring to the embodiment of FIGS. 1-4 and, for this reason, they are not further described.

According to this embodiment the main 13 and secondary 14 boxes can not have the housing groove 31 or the pressure element 30.

Still according to this embodiment, the housing compartment 17 has the vertical supporting elements 21, such as little vertical ribs, abutting against the lower surface of the main 13 and secondary 14 ASi-boxes.

Figure 6:
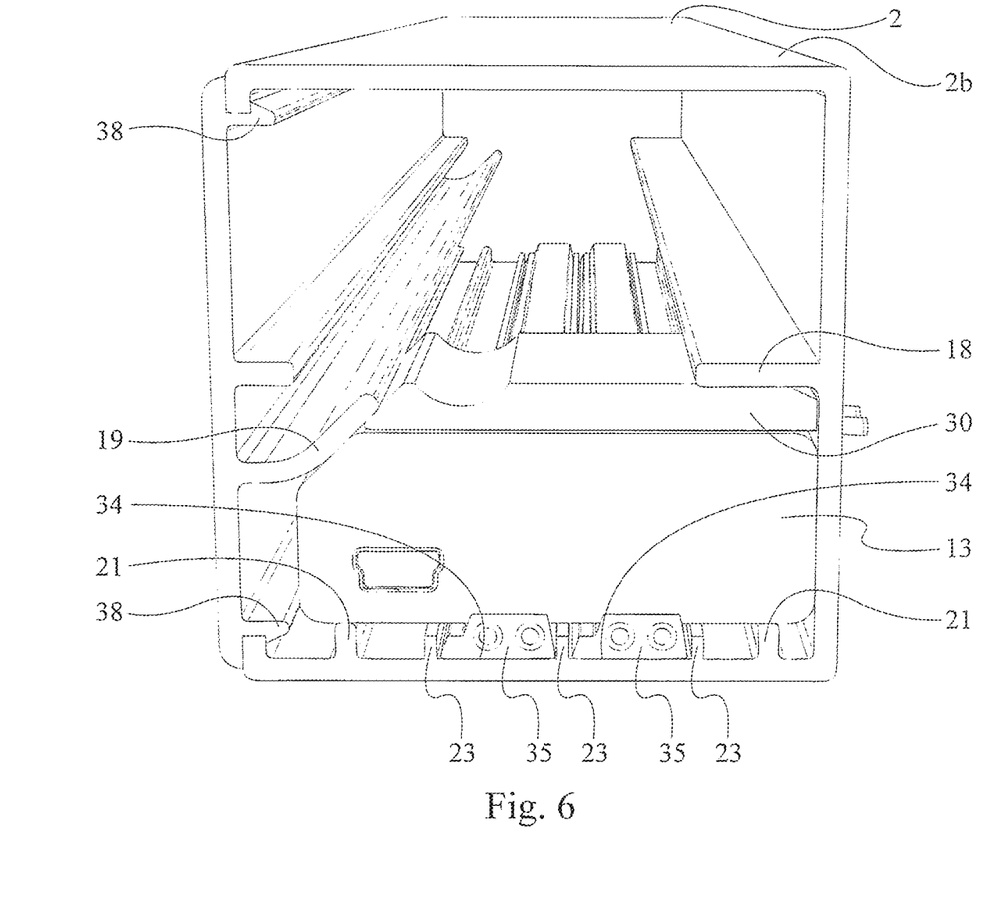
FIG. 6 is a schematic front view of another alternative implementation of supporting frame for the conveying system according to the present invention.

In FIG. 6 an alternative embodiment completely similar to that of FIGS. 5a, 5b is shown, with the exception of the vertical ribs 23 not having an upper curved portion.

Therefore, what mentioned for the embodiment shown in FIGS. 5a, 5b still goes for this embodiment.

Figure 7:
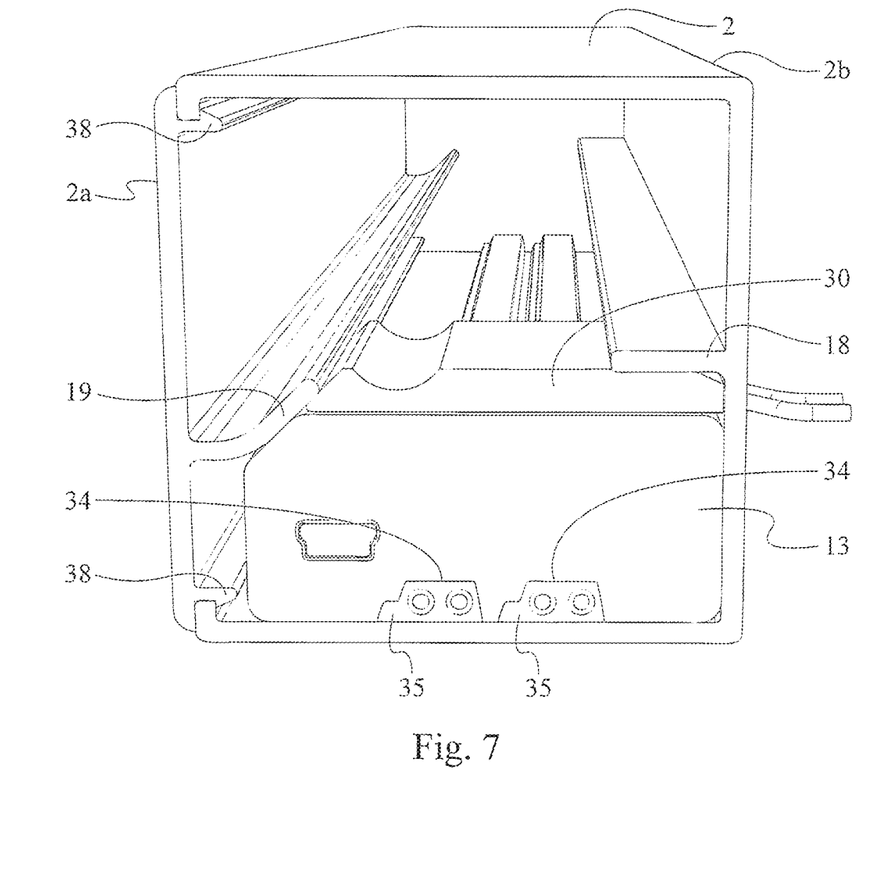
FIG. 7 is a schematic front view of another alternative implementation of supporting frame for the conveying system according to the present invention.

In FIG. 7 another embodiment completely similar to that of FIG. 6 and FIGS. 5a, 5b is shown, with the exception of the housing seats 34 for the AS-interface cables 35 being realized in profiled seats provided in the lower surface of the main 13 and/or secondary 14 ASi-boxes and in the base of the C-shaped half-shell 2b.

Each profiled seat is shaped so that to negative reproduce the outer profile of an AS-interface cable 35.

Figure 8:
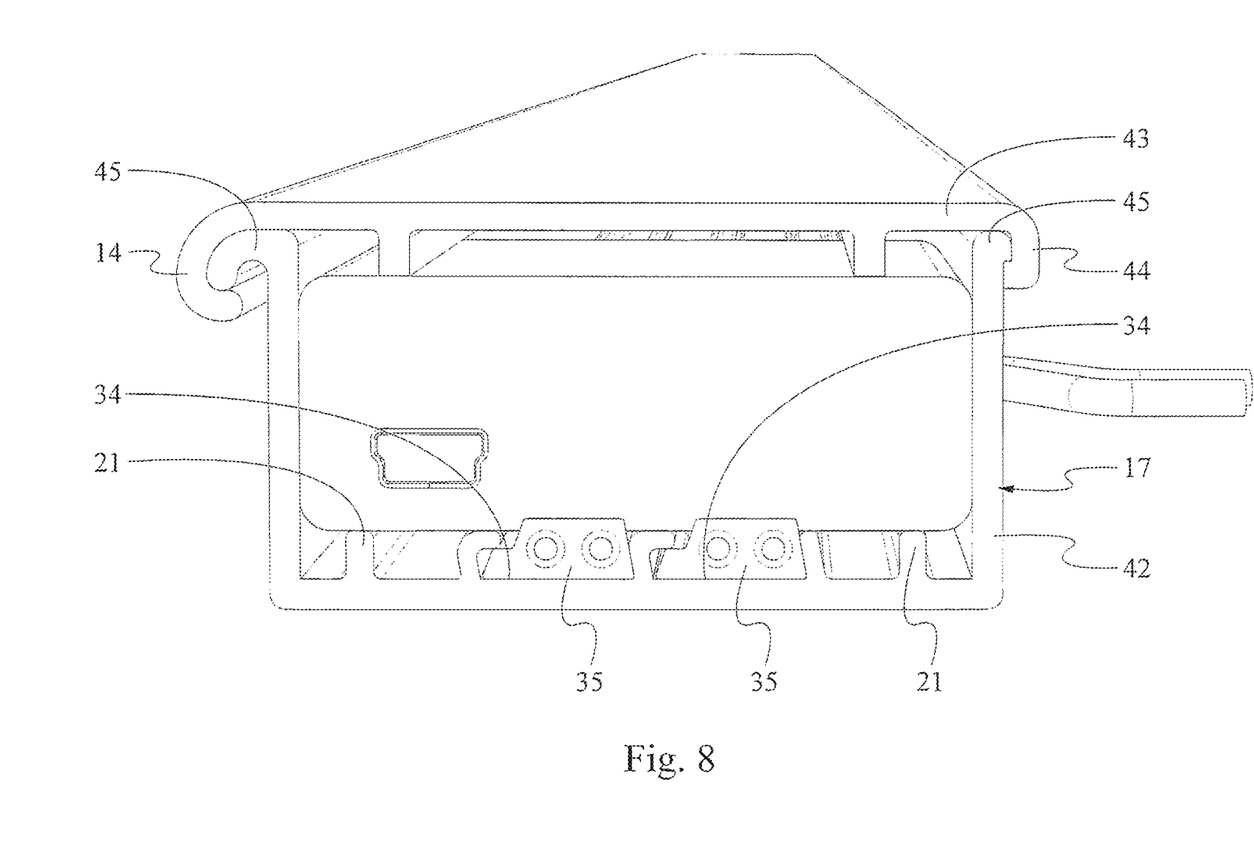
FIG. 8 is a schematic front view of an alternative implementation of housing compartment for the conveying system according to the present invention. *****

In FIG. 8 another embodiment of the housing compartment 17 is shown.

The housing compartment 17 looks like a lower U-section 42 closed on top by an upper lid 43.

The upper lid 43 has curved ending portions 44 adapted to engage with hooked portions of the lower section 42 to allow the upper lid 43 and the lower section 42 to be coupled and decoupled.

The housing compartment 17 provides for two housing seats 34 for two AS-interface cables 35, which adjoin.

The two housing seats 34 for two AS-interface cables are realized in part among three vertical ribs 23 which are transversely spaced, two transversely-spaced vertical ribs 23 are arranged at such a transversal distance to house the AS-interface cable 35 as interposed therebetween.

The vertical ribs 23 extend along the feeding direction F substantially for the whole extent of the conveying system itself.

According to this embodiment there are three vertical ribs 23 that are transversely spaced and, along with the base of the compartment 17, that realize at least in part two adjacent and parallel housing seats 34 for two AS-interface cables 35. Still according to this embodiment, the housing compartment 17 has vertical supporting elements 21, such as little vertical ribs, extending vertically from the base of the compartment 17 to abut against the lower surface of the main 13 or secondary 14 boxes, once the latter have been inserted into the housing compartment 17.

According to this embodiment, the pressure element 30 is made integral with the upper lid 43, it extends vertically from the latter inside the compartment 17 towards the main 13 and/or secondary 14 ASi-boxes in order to abut, when the upper lid 43 is closed, against such a main 13 and/or secondary 14 boxes so that to push it against the AS-interface cables 35 below.

The pressure element 30, according to this embodiment shown in FIG. 8, is composed of two vertical ribs 36 extending vertically from the upper lid 43. The top cover 43 instead realizes the contrast element for the pressure element 30.

The extent of the vertical ribs 36 is such that the ribs, when the lid 43 is closed, abut against the main 13 and/or secondary 14 ASi-boxes in order to push the latter against the AS-interface cables 35 below.

The present invention has been described referring to some embodiments. To the embodiments herein represented in detail various modifications can be made, anyway remaining in the protection scope of the invention, defined by the following claims.

The invention claimed is:

1. A conveying system line (100), comprising:
   at least one supporting frame (2, 3) extending substantially in parallel with a feeding direction (F) of the system;
   at least one plurality of driving elements supported by said supporting frames (2, 3);
   at least one motor (9) for driving at least one portion of said at least one plurality of driving elements;
   at least one drive assembly to transfer motion from said at least one motor to said at least one portion of the at least one plurality of driving elements;
   at least one control and power ASi system;
   at least one main ASi-controller (12),
   said main ASi-controller (12) comprising a main ASi-box (13);
   at least one secondary ASi-controller (11),
   said at least one secondary ASi-controller (11) comprising a secondary ASi-box (14),
   said main ASi-box (13) and said secondary ASi-box (14) having at least one corresponding first transversal coupling dimension (M);
   at least one AS-interface cable (35) with protruding piercing needles or knifes (7), said at least one main ASi-controller (12) communicating with said at least one secondary ASi-controller (11) through said at least one AS-interface cable (35),
   said supporting frame (2,3) comprising a housing compartment (17) extending in the feeding direction of the system line, said housing compartment (17) adapted to house said main ASi-box (13) and said secondary ASi-box (14),
   said supporting frame (2, 3) further comprising fastening means to removably block said main ASi-box (13) and said secondary ASi-box (14) inside the housing compartment (17),
   said housing compartment (17) comprising at least one housing seat (34) for said at least one AS-interface cable (35),
   wherein said at least one housing seat (34) arranges the at least one As-interface cable (35) in such a position, with respect to said main ASi-box (13) and the secondary ASi-box (14) so that the protruding piercing needles or knifes (7) penetrate both said main ASi-box (13) and said secondary ASi-box (14) by a first distance in order to implement electrical connection among said at least one main ASi-controller (12), said at least one secondary ASi-controller (11), and said at least one As-interface cable (35),
   said fastening means comprising:
   at least one contrast pressure element spaced apart, by at least the first distance, from said main ASi-box (13) and the secondary ASi-box (14),
   at least one pressure element (30) removably positioned between said main ASi-box (13) and said contrast pressure element and removably positioned between the secondary ASi-box (14) and said contrast element pressure element so that said main ASi-box (13) and the secondary ASi-box (14) are kept in position against said at least one AS-interface cable (35) with said protruding piercing needles or knifes (7) penetrating both said main ASi-box (13) and said secondary ASi-box (14) by the first distance.

2. The conveying line (100) according to claim 1, wherein said at least one contrast pressure element comprises at least one first rib (18) transversally extending towards an inside of the supporting frame (2; 3) and said at least one pressure element (30) comprises at least one spacer shaped to be removably positioned between said at least one first rib (18) and said ASi-box main (13) and said secondary ASi-box (14) so that said ASi-box main (13) and said secondary ASi-box (14) are kept in position with respect to said at least one AS-interface cable (35).

3. The conveying line (100) according to claim 2, wherein said fastening means comprise at least one second rib (19) transversally extending towards the inside of the supporting frame (2, 3), on a first wall opposed to a second wall of said first rib (18).

4. The conveying line (100) according to claim 3, wherein said second rib (19) is shaped and dimensioned to couple with an inclined surface (33) provided next to at least one transversal end of the main ASi-box (13) and the secondary ASi-box (14).

5. The conveying line (100) according to claim 4, wherein said housing has a seat (17) with a second transversal dimension (N) greater than or equal to the first transversal coupling dimension (M); and said at least one pressure element (30) has such a transversal dimension, greater that N/2, to abut at least partially against said second rib (19).

6. The conveying line (100) according to claim 3, wherein said second rib (19) is shaped and dimensioned to abut, at least partially, against a second inclined surface (32) provided next to at least one transversal end of said at least one pressure element (30).

7. The conveying line (100) according to claim 3, wherein said second rib (19) is elastically flexible.

8. The conveying line (100) according to claim 1, wherein said fastening means comprise an upper lid of said housing compartment (17).

9. The conveying line (100) according to claim 8, wherein said upper lid comprises said at least one pressure element (30) extending from said upper lid to said main ASi-boxes (13) and said secondary ASi-boxes (14) to abut against said main ASi-boxes (13) and said secondary ASi-boxes (14) when the upper lid is closed.

10. The conveying line (100) according to claim 1, wherein said housing compartment (17) comprises at least two vertical ribs (23) which are transversely spaced in order to house said at least one AS-interface cable (35) interposed there between.

11. The conveying line (100) according to claim 10, wherein at least one of said vertical ribs (23) has a curved portion to vertically block at least one portion of said at least one AS-interface cable (35).

12. The conveying line (100) according to claim 1, wherein said at least one housing seat (34) for said at least one AS-interface cable (35) is made, at least partially, in said ASi-box main (13) and said secondary ASi-box (14).

13. The conveying line (100) according to claim 1, wherein said housing seat comprises at least two side supporting ribs (24), each supporting ribs (24) protruding from an inner wall of the supporting frame (2, 3) to laterally support said main ASi-box (13) and said secondary ASi-box (14).

14. The conveying line (100) according to claim 1, wherein said housing seat comprises at least one vertical supporting element (21) extending from a stiffening element (22) transversal to inner walls of the supporting frame (2, 3); said at least one vertical supporting element (21) being shaped to engage into a coupling seat (27) provided on a lower surface of said main ASi-box (13) and said secondary ASi-box (14).

15. A conveying system line (100), comprising:
a supporting frame (2, 3) extending substantially in parallel with a system feeding direction (F) and comprising a housing compartment (17) extending in the system feeding direction, said housing compartment (17) comprising a housing seat (34);
driving elements rotatably mounted on the supporting frame;
a motor (9) that drives the driving elements (5);
a control and power ASi system;
a main ASi-controller (12) comprising a main ASi-box (13) housed in the housing compartment (17);
a secondary ASi-controller (11) comprising a secondary ASi-box (14) housed in the housing compartment (17),
said main ASi-box (13) and said secondary ASi-box (14) having a corresponding first transversal coupling dimension (M);
an AS-interface cable (35) with protruding piercing elements (7) housed in the housing seat (34), said main ASi-controller (12) communicating with said secondary ASi-controller (11) through said at least one AS-interface cable (35),
a fastening arrangement removably blocking said main ASi-box (13) and said secondary ASi-box (14) inside the housing compartment (17),
wherein said housing seat (34) arranges the AS-interface cable (35) with respect to the main ASi-box (13) and the secondary ASi-box (14) so that the protruding piercing elements (7) penetrate both said main ASi-box (13) and said secondary ASi-box (14) by a first distance in order to implement electrical connection among the main ASi-controller (12), the secondary ASi-controller (11), and the AS-interface cable (35),
the fastening arrangement comprising i) a contrast pressure element (18) spaced apart, by at least the first distance, from said main ASi-box (13) and the secondary ASi-box (14), ii) pressure elements (30) removably positioned between said main ASi-box (13) and said contrast pressure element and removably positioned between the secondary ASi-box (14) and the contrast element pressure element to keep said main ASi-box (13 and the secondary ASi-box (14) in position against said AS-interface cable (35) with said protruding piercing elements (7) penetrating both said main ASi-box (13) and said secondary ASi-box (14) by the first distance.

16. The conveying line (100) according to claim 15, wherein said contrast pressure element comprises a first rib (18) mounted on a first wall of the supporting frame (2, 3) and transversally extending towards an inside of the supporting frame (2; 3) and each said pressure element (30) comprises at least one spacer shaped to be removably positioned between said first rib (18) and said ASi-box main (13) and said secondary ASi-box (14) so that said ASi-box main (13) and said secondary ASi-box (14) are kept in position with respect to said AS-interface cable (35).

17. The conveying line (100) according to claim 16, wherein said fastening arrangement further comprise a second rib (19) mounted on a second wall of the supporting frame opposite the first wall and transversally extending towards the inside of the supporting frame (2, 3) toward the first rib (18).

18. The conveying line (100) according to claim 17, wherein said second rib (19) is shaped and dimensioned to couple with an inclined surface (33) at a transversal end of the main ASi-box (13), to couple with an inclined surface (33) at a transversal end of the secondary ASi-box (14), and to abut against an inclined surface (32) at a transversal end of said pressure elements (30).

19. The conveying line (100) according to claim 18, wherein said pressure elements (30) press against an upper surface of said the main ASi-box (13) and press against an upper surface of the secondary ASi-box (14).

20. The conveying line (100) according to claim 15, wherein said housing compartment (17) comprise vertical ribs (23) which are transversely spaced and house said AS-interface cable (35) interposed there between, at least one of said vertical ribs (23) having a curved portion to vertically block at least one portion of said AS-interface cable (35).

* * * * *